(12) United States Patent
Liang et al.

(10) Patent No.: US 12,433,695 B2
(45) Date of Patent: Oct. 7, 2025

(54) STACKABLE QUICK-RELEASE APPARATUS AND SURGICAL NAVIGATION SYSTEM

(71) Applicants: XIANGYA HOSPITAL OF CENTRAL SOUTH UNIVERSITY, Changsha (CN); NINGBO INSTITUTE OF MATERIALS TECHNOLOGY AND ENGINEERING, CHINESE ACADEMY OF SCIENCES, Ningbo (CN)

(72) Inventors: Ye Liang, Changsha (CN); Canhua Jiang, Changsha (CN); Jiaji Zhang, Ningbo (CN); Guokun Zuo, Ningbo (CN); Tao Song, Ningbo (CN); Cong Xiao, Ningbo (CN); Yutian Zheng, Changsha (CN); Binzhu Wang, Changsha (CN); Shouhui Huang, Changsha (CN); Ai Jian, Changsha (CN)

(73) Assignees: XIANGYA HOSPITAL OF CENTRAL SOUTH UNIVERSITY, Changsha (CN); NINGBO INSTITUTE OF MATERIALS TECHNOLOGY AND ENGINEERING, CHINESE ACADEMY OF SCIENCES, Ningbo (CN)

( * ) Notice: Subject to any disclaimer, the term of this patent is extended or adjusted under 35 U.S.C. 154(b) by 0 days.

(21) Appl. No.: 18/994,638

(22) PCT Filed: Jun. 5, 2024

(86) PCT No.: PCT/CN2024/097394
§ 371 (c)(1),
(2) Date: Jan. 15, 2025

(87) PCT Pub. No.: WO2024/255654
PCT Pub. Date: Dec. 19, 2024

(65) Prior Publication Data
US 2025/0262000 A1 Aug. 21, 2025

(30) Foreign Application Priority Data
Jun. 14, 2023 (CN) .......................... 202310699938.6

(51) Int. Cl.
*A61B 34/20* (2016.01)
*F16B 7/20* (2006.01)

(52) U.S. Cl.
CPC ................ *A61B 34/20* (2016.02); *F16B 7/20* (2013.01); *A61B 2034/2072* (2016.02)

(58) Field of Classification Search
CPC .......................... F16B 7/20; A61B 2034/2072
See application file for complete search history.

(56) References Cited

U.S. PATENT DOCUMENTS 8,737,708 B2 * 5/2014 Hartmann .............. A61B 34/20
   382/128
11,801,062 B2 * 10/2023 Nguyen ................. A61B 90/50
   (Continued)

FOREIGN PATENT DOCUMENTS

CN 201688068 U 12/2010
CN 202251309 U 5/2012
(Continued)

*Primary Examiner* — Michael P Ferguson
(74) *Attorney, Agent, or Firm* — Bayramoglu Law Offices LLC

(57) ABSTRACT

A stackable quick-release apparatus and a surgical navigation system are provided. The stackable quick-release apparatus is configured to connect two adjacent cascade tubes of the surgical navigation system. The stackable quick-release
(Continued)

apparatus includes a connection rod, an abutment rod, and an elastic member. The connection rod is arranged at an end of one of the cascade tubes, and the abutment rod is arranged at an end of the other of the cascade tubes. A mounting groove is provided on an end surface of the connection rod, the elastic member is configured to be mounted on an inner wall of the mounting groove, and the abutment rod on one of the cascade tubes is configured to be inserted into the mounting groove of the connection rod on the other of the cascade tubes and abut against the elastic member.

3 Claims, 5 Drawing Sheets

(56) References Cited

U.S. PATENT DOCUMENTS

| | | | |
|---|---|---|---|
| 12,279,919 B2* | 4/2025 | Ghanam | A61B 10/0233 |
| 2012/0051831 A1* | 3/2012 | Waters, Jr. | E01C 11/14 |
| | | | 29/445 |
| 2016/0186792 A1* | 6/2016 | Valencia | F16B 7/0406 |
| | | | 403/349 |

FOREIGN PATENT DOCUMENTS

| | | |
|---|---|---|
| CN | 102562748 A | 7/2012 |
| CN | 203822793 U | 9/2014 |
| CN | 104314945 A | 1/2015 |
| CN | 207740300 U | 8/2018 |
| CN | 110575273 A | 12/2019 |
| CN | 213419590 U | 6/2021 |
| CN | 113175574 A | 7/2021 |
| CN | 214699672 U | 11/2021 |
| CN | 215903121 U | 2/2022 |
| CN | 217481701 U | 9/2022 |
| CN | 115182918 A | 10/2022 |
| CN | 218165797 U | 12/2022 |
| CN | 218500801 U | 2/2023 |
| CN | 219147913 U | 6/2023 |
| CN | 116439834 A | 7/2023 |
| DE | 102007004357 A1 | 8/2008 |
| EP | 1164327 A1 | 12/2001 |
| EP | 3483375 A1 | 5/2019 |
| EP | 4063573 A1 | 9/2022 |

* cited by examiner

STACKABLE QUICK-RELEASE APPARATUS AND SURGICAL NAVIGATION SYSTEM

CROSS-REFERENCE TO THE RELATED APPLICATIONS

This application is the national phase entry of International Application No. PCT/CN2024/097394, filed on Jun. 5, 2024, which is based upon and claims priority to Chinese Patent Application No. 202310699938.6, filed on Jun. 14, 2023, the entire contents of which are incorporated herein by reference.

TECHNICAL FIELD

The present invention relates to the field of medical instrument technologies, and specifically, to a stackable quick-release apparatus and a surgical navigation system.

BACKGROUND

In the field of oral surgeries, a special instrument is usually used to extend into an oral cavity of a patient for operation. Because space of the oral cavity is small, and the operator's vision is limited and usually cannot accurately know the specific position of the instrument, resulting in increased surgical risks and a poor postoperative effect. With popularization of navigation technologies and digital oral surgery technologies, higher requirements are imposed on the precision of positioning of treatment points, and various types of positioning instruments have been developed.

SUMMARY

Technical Problem

In a current commonly used manner of optical tracking, a three-dimensional position of an oral cavity of a patient and a three-dimensional position of an instrument are obtained by using an infrared light emitting apparatus and an infrared light receiving apparatus, to guide a surgery. This technical solution has high accuracy, but this apparatus is limited by occlusion of a tissue, and has a limitation when the apparatus is used in a deep lacunar. In some other solutions, a manner of electromagnetic tracking is used. In this method, through positioning in a magnetic field, a non-magnetic object can be penetrated to implement positioning, to avoid a defect of the optical tracking. However, accuracy is not high, and use is limited under a high accuracy requirement. In the foregoing solution, precise light, a magnetic-field emitting apparatus, and a magnetic-field receiving apparatus need to be used, and hardware costs are high. In addition, in narrow oral space, occlusion easily occurs and causes a navigation failure, or accuracy cannot satisfy a requirement of an oral surgery. In addition, there is a mechanical navigation apparatus. A connection structure of a cascade tube of the mechanical navigation apparatus is complex. When a length is adjusted, disassembly and assembly are inconvenient, resulting in low working efficiency.

Technical Solution

The present invention is intended to resolve a problem that a connection structure of an existing cascade tube for distance measurement, level measurement, and orientation determination in a surgery is complex, and disassembly and assembly are inconvenient.

To resolve the foregoing problem, the present invention proposes the following technical solutions.

A stackable quick-release apparatus is provided, configured to connect two adjacent cascade tubes of a surgical navigation system. The stackable quick-release apparatus includes a connection rod, an abutment rod, and an elastic member. The connection rod is arranged at an end of one of the cascade tubes, and the abutment rod is arranged at an end of the other of the cascade tubes. A mounting groove is provided on an end surface of the connection rod. The elastic member is configured to be mounted on an inner wall of the mounting groove. The abutment rod on one of the cascade tubes is configured to be inserted into the mounting groove of the connection rod on the other of the cascade tubes and abut against the elastic member.

A connection pin is arranged on an outer wall of the abutment rod. A connection groove matching the connection pin is provided on the inner wall of the mounting groove. The connection groove includes a first groove, a second groove, and a third groove. The first groove is provided in an axial direction of the connection rod, and an opening of the first groove is provided facing an access opening of the mounting groove. The second groove perpendicular to the first groove is connected to an end of the first groove away from the opening. The third groove is connected to an end of the second groove away from the first groove, and the third groove and the first groove are provided in the same direction.

The abutment rod is configured to be inserted into the mounting groove and rotated, to enable the connection pin to move into the first groove and move from the first groove to the second groove. The elastic member is configured to abut against the abutment rod, to enable the connection pin on the outer wall of the abutment rod to be engaged in the third groove.

Beneficial Effect

In comparison with the prior art, the stackable quick-release apparatus provided in the present invention has, but is not limited to, the following beneficial effects:

When the cascade tubes in the surgical navigation system are short, a quantity of cascade tubes may be increased, and the two adjacent cascade tubes are connected by the stackable quick-release apparatus. During mounting, the abutment rod on one of the cascade tubes is first inserted into the mounting groove of the connection rod on the other of the cascade tubes. During insertion, attention is paid to inserting the connection pin into the first groove of the connection groove, and enabling the connection pin to move to a position in communication with the second groove in the first groove when enabling an end portion of the abutment rod to compress the elastic member and abut against the elastic member. Then, the abutment rod is rotated, and the abutment rod drives the connection pin to rotate, to enable the connection pin to move from the first groove to a position in communication with the third groove in the second groove. Finally, a hand is loosened to remove an external force on the abutment rod. The elastic member pushes the abutment rod due to a restoration effect of the elastic member, the connection pin on the abutment rod moves from the second groove to the third groove, and the elastic member abuts against the abutment rod to enable the connection pin to be engaged in the third groove, so that the abutment rod is fixedly connected to the connection rod. The abutment rod is inserted into the mounting groove and rotated, to enable the connection pin to move into the first groove and move from the first groove to the second groove. The elastic member is configured to abut against the abutment rod, to enable the connection pin on the outer wall of the abutment rod to be engaged in the third groove. This structure is simple, and operation is convenient, to help quickly disassemble and assemble the cascade tube, so that a user can adjust a length of the cascade tube in the surgical navigation system based on an actual situation. The arrangement of the elastic member helps narrow a gap at a junction when the two adjacent cascade tubes are connected, to improve connection stability and connection precision, and reduce an error.

Optionally, a guide chamfer is provided in the second groove, and the guide chamfer is gradually inclined toward the end away from the opening in a direction from the first groove to the third groove.

Optionally, a spring groove in communication with the mounting groove is provided on the inner wall of the mounting groove and inside the connection rod. The elastic member includes a connection spring, and the connection spring is mounted in the spring groove. One end of the connection spring is connected to an inner wall of the spring groove, and another end of the connection spring is configured to connect to the abutment rod.

Optionally, the elastic member further includes a connection plate, and the connection plate is configured to move in the mounting groove. One end of the spring groove is connected to the inner wall of the spring groove, and another end of the connection spring is connected to the connection plate. A groove is provided in a middle part on a side of the connection plate away from the connection spring, and the abutment rod is configured to press against an interior of the groove.

Optionally, the mounting groove includes an inner groove, a middle groove, and a limiting groove in communication with each other in sequence from inside to outside. The inner groove, the middle groove, and the limiting groove are provided coaxially with the connection rod. A diameter of the inner groove is greater than a diameter of the middle groove, and a diameter of the limiting groove is greater than the diameter of the middle groove. The connection plate is configured to move in the inner groove. The connection groove is provided on an inner wall of the middle groove. A first step surface is provided at a junction between the limiting groove and the middle groove, and the opening of the first groove is provided facing the first step surface.

The abutment rod includes a first rod and a second rod. The first rod is configured to connect to an end of the cascade tube, and a diameter of the first rod matches the limiting groove. The second rod is configured to be arranged on an end of the first rod away from the cascade tube, and a diameter of the second rod matches the middle groove. A second step surface is provided at a junction between the first rod and the second rod, the second step surface matches the first step surface, and the connection pin is arranged on an outer wall of the second rod.

Optionally, a plurality of connection pins are evenly arranged in a circumferential direction of the abutment rod, two rows of connection pins are arranged in an axial direction of the abutment rod, and the two rows of connection pins are alternately distributed at intervals. A plurality of connection grooves are evenly provided at intervals on the inner wall of the middle groove, and a projection of the connection pin in the axial direction of the abutment rod matches a projection of the connection groove in the axial direction of the connection rod.

Optionally, the stackable quick-release apparatus further includes a fixing cylinder, a fixing plate, a fixing bolt, and a fixing nut. The fixing cylinder is fixedly arranged at an end of the connection rod away from the mounting groove, and an end of the cascade tube is configured to be inserted into the fixing cylinder. A fixing groove is formed through a side wall of the fixing cylinder, fixing plates are arranged on two sides of the fixing groove on the side wall of the fixing cylinder, and the two fixing plates are configured to be connected by the fixing bolt and the fixing nut. The present invention further provides a surgical navigation system, including a cascade tube and the foregoing stackable quick-release apparatus. The cascade tube includes a first bent tube and a second bent tube. The first bent tube and the second bent tube are of an L-shaped structure. A connection rod of the stackable quick-release apparatus is configured to connect to an end of the first bent tube, and an abutment rod of the stackable quick-release apparatus is configured to connect to an end of the second bent tube.

Optionally, the surgical navigation system further includes a rotation structure. An end of the first bent tube away from the connection rod and an end of the second bent tube away from the abutment rod are connected by the rotation structure, to enable the first bent tube and the second bent tube to rotate relative to each other.

Optionally, the rotation structure includes a connection head, a rotation bearing, a limiting portion, and a connection cap. The rotation bearing is sleeved on the end of the first bent tube away from the connection rod, and the limiting portion is mounted in an end portion of the first bent tube outside the rotation bearing.

The connection head is fixedly connected to the end of the second bent tube away from the abutment rod. A connection through groove matching the first bent tube, the rotation bearing, and the limiting portion is provided at an end portion of the connection head. The end of the first bent tube away from the connection rod, the rotation bearing, and the limiting portion are configured to be mounted in the connection through groove. The connection cap is configured to be fixed to the connection head facing the connection through groove by a screw and to limit the rotation bearing and the limiting portion in the connection through groove.

In comparison with the prior art, the surgical navigation system provided in the present invention has, but is not limited to, the following beneficial effects: The rotation bearing and the connection through groove cooperate with each other to rotatably connect the first bent tube and the second bent tube, so that the first bent tube and the second bent tube of the cascade tube can rotate relative to each other. Therefore, flexibility of the cascade tube during use is improved, so that the cascade tube can rotate based on an actual requirement, and accuracy of a navigation position is ensured.

DESCRIPTIONS OF REFERENCE NUMERALS

Figure 1:
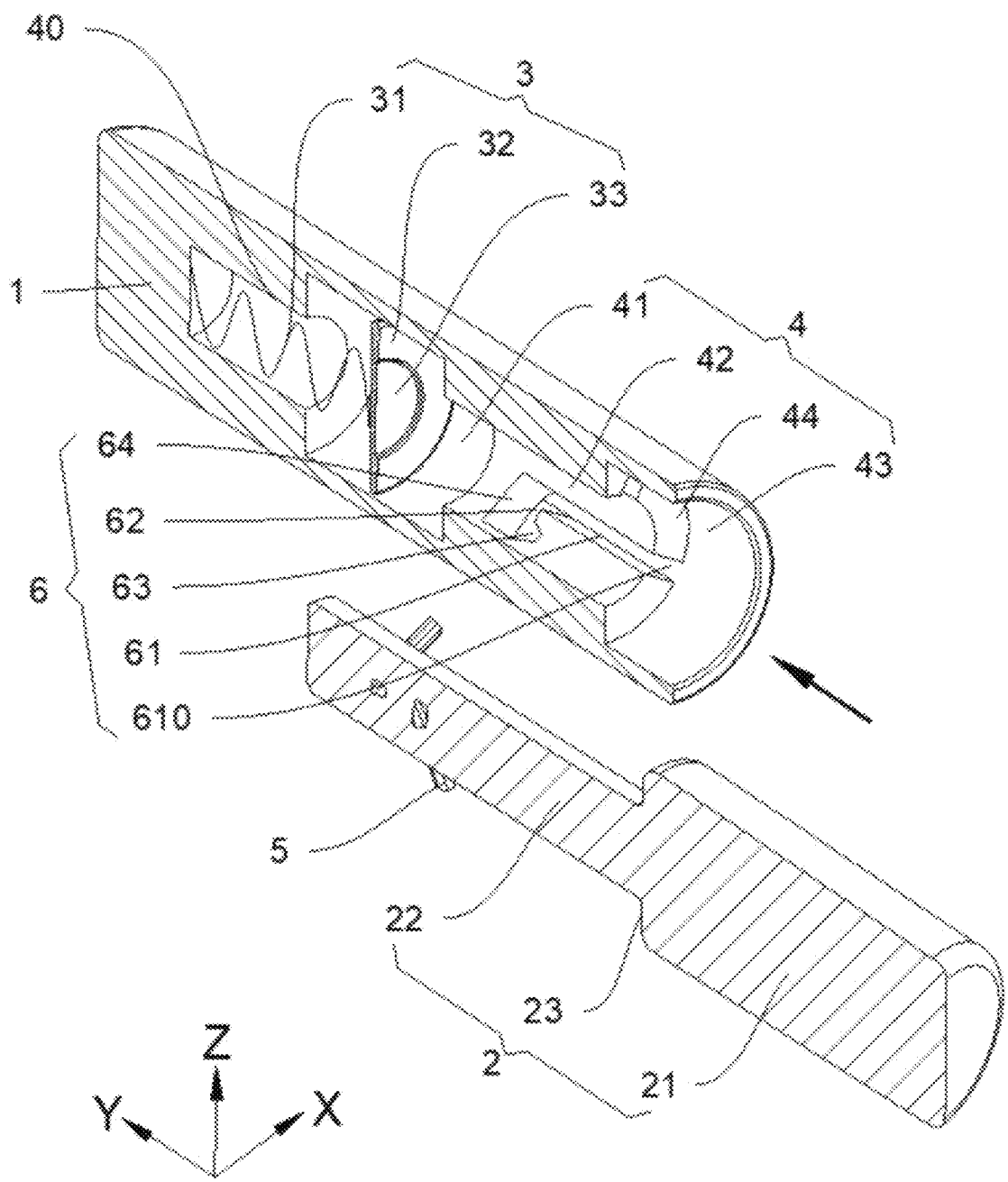
FIG. 1 is a schematic diagram of a connection relationship between a connection rod and an abutment rod according to the present invention.

1: connection rod, 11: fixing cylinder, 12: fixing plate, 13: fixing bolt, 2: abutment rod, 21: first rod, 22: second rod, 23: second step surface, 3: elastic member, 31: connection spring, 32: connection plate, 33: groove, 4: mounting groove, 40: spring groove, 41: inner groove, 42: middle groove, 43: limiting groove, 44: first step surface, 5: connection pin, 6: connection groove, 61: first groove, 610: opening, 62: second groove, 63: third groove, 64: guide chamfer, 7: rotation structure, 71: connection head, 72: rotation bearing, 73: limiting portion, 74: connection cap, 75: connection through groove, 8: cascade tube, 81: first bent tube, and 82: second bent tube.

DETAILED DESCRIPTION OF THE EMBODIMENTS

Implementations of this application are further described in detail with reference to the accompanying drawings and embodiments below. The following embodiments are for describing this application, but are not intended to limit the scope of this application.

It needs to be understood that, in descriptions of the present invention, a direction or positional relationship indicated by terms such as "up", "down", "front", "back", "left", and "right" is a direction or positional relationship based on illustrations in the drawings, and is merely intended for ease or brevity of description of the present invention, but does not necessarily mean or imply that the indicated assembly or component is provided in the specified direction or constructed or operated in the specified direction. Therefore, such terms are not to be understood as a limitation on the present invention.

It should be noted that, in a coordinate system XYZ provided in this specification, a positive direction of an X-axis represents a right direction, a reverse direction of the X-axis represents a left direction, a positive direction of a Y-axis represents a front direction, a reverse direction of the Y-axis represents a rear direction, a positive direction of a Z-axis represents an up direction, and a reverse direction of the Z-axis represents a down direction. Meanings of the Z-axis, the X-axis, and the Y-axis are only for ease of describing the present disclosure and simplifying the descriptions, but do not necessarily mean or imply that the indicated assembly or component is provided in the specified direction or constructed or operated in the specified direction. Therefore, such meanings are not to be understood as a limitation on the present invention.

Referring to FIG. 1 to FIG. 5, the present invention provides a stackable quick-release apparatus, configured to connect two adjacent cascade tubes 8 of a surgical navigation system. The stackable quick-release apparatus includes a connection rod 1, an abutment rod 2, and an elastic member 3. The connection rod 1 is arranged at an end of one of the cascade tubes 8, and the abutment rod 2 is arranged at an end of the other of the cascade tubes 8. A mounting groove 4 is provided on an end surface of the connection rod 1. The elastic member 3 is configured to be mounted on an inner wall of the mounting groove 4. The abutment rod 2 on one of the cascade tubes 8 is configured to be inserted into the mounting groove 4 of the connection rod 1 on the other of the cascade tubes 8 and abut against the elastic member 3 (where an arrow in FIG. 1 represents that the abutment rod 2 is configured to be inserted into the mounting groove 4 of the connection rod 1 in an arrow direction).

Figure 2:
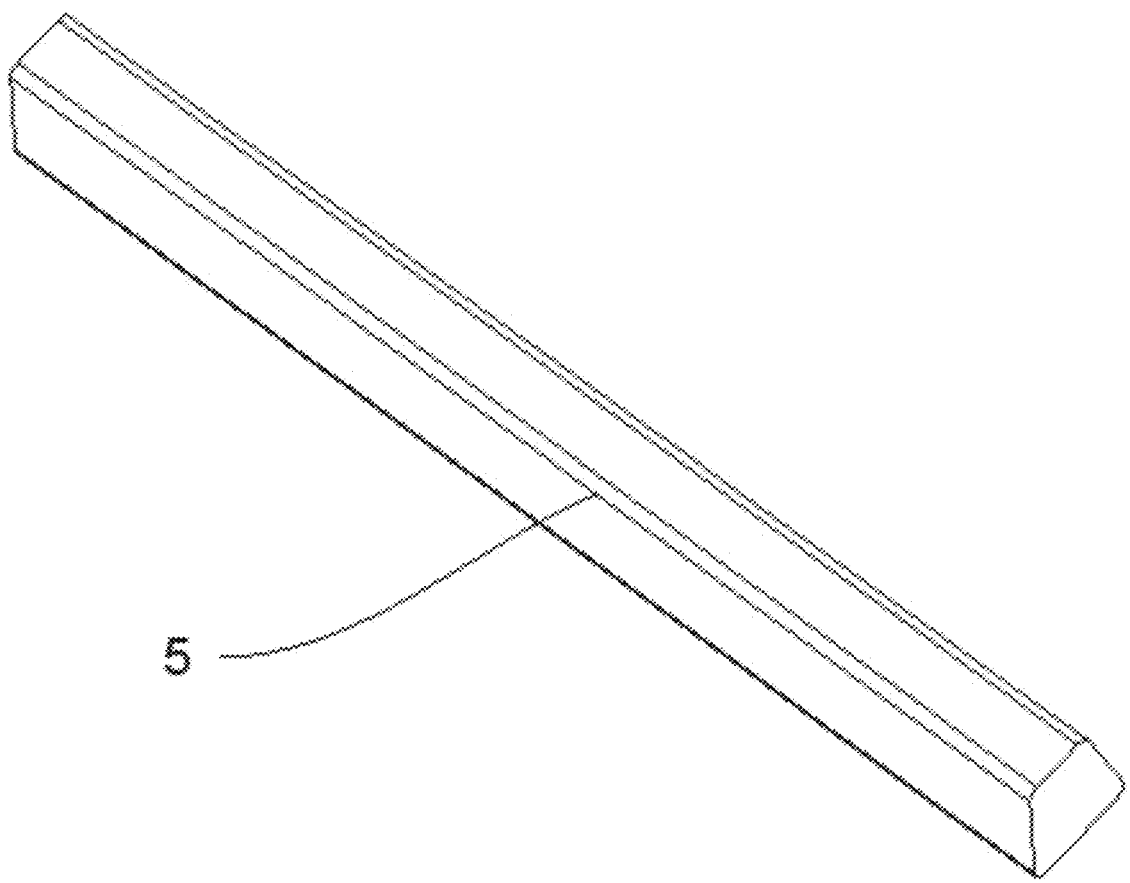
FIG. 2 is a schematic diagram of a structure of a connection pin according to an embodiment of the present invention.

Referring to FIG. 1 and FIG. 2, a connection pin 5 is arranged on an outer wall of the abutment rod 2. A connection groove 6 matching the connection pin 5 is provided on the inner wall of the mounting groove 4. The connection groove 6 includes a first groove 61, a second groove 62, and a third groove 63. The first groove 61 is provided in an axial direction of the connection rod 1, and an opening 610 of the first groove 61 is provided facing an access opening of the mounting groove 4. The second groove 62 perpendicular to the first groove 61 is connected to an end of the first groove 61 away from the opening 610. The third groove 63 is connected to an end of the second groove 62 away from the first groove 61, and the third groove 63 and the first groove 61 are provided in the same direction.

The abutment rod 2 is configured to be inserted into the mounting groove 4 and rotated, to enable the connection pin 5 to move into the first groove 61 and move from the first groove 61 to the second groove 62. The elastic member 3 is configured to abut against the abutment rod 2, to enable the connection pin 5 on the outer wall of the abutment rod 2 to be engaged in the third groove 63.

In this embodiment, when the cascade tubes 8 in the surgical navigation system are short, a quantity of cascade tubes 8 may be increased, and the two adjacent cascade tubes 8 are connected by the stackable quick-release apparatus. During mounting, the abutment rod 2 on one of the cascade tubes 8 is first inserted into the mounting groove 4 of the connection rod 1 on the other of the cascade tubes 8. During insertion, attention is paid to inserting the connection pin 5 into the first groove 61 of the connection groove 6, and enabling the connection pin 5 to move to a position in communication with the second groove 62 in the first groove 61 when enabling an end portion of the abutment rod 2 to compress the elastic member 3 and abut against the elastic member 3. Then, the abutment rod 2 is rotated, and the abutment rod 2 drives the connection pin 5 to rotate, to enable the connection pin 5 to move from the first groove 61 to a position in communication with the third groove 63 in the second groove 62. Finally, a hand is loosened to remove an external force on the abutment rod 2. The elastic member 3 pushes the abutment rod 2 due to a restoration effect of the elastic member 3, the connection pin 5 on the abutment rod 2 moves from the second groove 62 to the third groove 63, and the elastic member 3 abuts against the abutment rod 2 to enable the connection pin 5 to be engaged in the third groove 63, so that the abutment rod 2 is fixedly connected to the connection rod 1. The abutment rod 2 is inserted into the mounting groove 4 and rotated, to enable the connection pin 5 to move into the first groove 61 and move from the first groove 61 to the second groove 62. The elastic member 3 is configured to abut against the abutment rod 2, to enable the connection pin 5 on the outer wall of the abutment rod 2 to be engaged in the third groove 63. This structure is simple, and operation is convenient, to help quickly disassemble and assemble the cascade tube 8, so that a user can adjust a length of the cascade tube 8 in the surgical navigation system based on an actual situation. The arrangement of the elastic member 3 helps narrow a gap at a junction when the two adjacent cascade tubes 8 are connected, to improve connection stability and connection precision, and reduce an error.

Referring to FIG. 1, optionally, a guide chamfer 64 is provided in the second groove 62, and the guide chamfer 64 is gradually inclined toward the end away from the opening 610 in a direction from the first groove 61 to the third groove 63.

Specifically, the guide chamfer 64 may be a straight surface or an arc surface.

In this embodiment, when the connection pin 5 rotates with the abutment rod 2, the connection pin 5 moves from a junction between the first groove 61 and the second groove 62 to a junction between the second groove 62 and the third groove 63 along the second groove 62. When moving in the second groove 62, the connection pin 5 moves along the guide chamfer 64. The arrangement of the guide chamfer 64 can enable the connection pin 5 to move in the second groove 62 more smoothly, to avoid stalling when the connection pin 5 moves in the second groove 62, so that disassembly and assembly are convenient, and efficiency of the disassembly and assembly is improved.

Referring to FIG. 2, optionally, a cross section of the connection pin 5 is of an isosceles-trapezoid structure. A width of the first groove 61 is greater than a longer base of the isosceles-trapezoid structure of the connection pin 5. A width of the second groove 62 is greater than a height of the isosceles-trapezoid structure of the connection pin 5. A shape of the third groove 63 matches the cross section of the connection pin 5, and is also of an isosceles-trapezoid structure. When the connection pin 5 is arranged on the abutment rod 2, the longer base of the isosceles-trapezoid structure of the connection pin 5 is close to the end portion of the abutment rod 2, and a shorter base of the isosceles-trapezoid structure of the connection pin 5 is away from the end portion of the abutment rod 2. In this case, a shorter base of the isosceles-trapezoid structure of the third groove 63 is close to the opening 610, and a longer base of the isosceles-trapezoid structure of the third groove 63 is away from the opening 610 and is connected to the second groove 62.

In this embodiment, the cross section of the connection pin 5 is of the isosceles-trapezoid structure, structures of the first groove 61, the second groove 62, and the third groove 63 match that of the connection pin 5, the width of the first groove 61 is greater than the longer base of the isosceles-trapezoid structure of the connection pin 5, and the width of the second groove 62 is greater than the height of the isosceles-trapezoid structure of the connection pin 5, to help enable the connection pin 5 to move in the first groove 61 and the second groove 62 smoothly. The shape of the third groove 63 matches the cross section of the connection pin 5. When the connection pin 5 is engaged in the third groove 63, the arrangement of the isosceles-trapezoid structure helps the connection pin 5 be more stable in the third groove 63, and there is no gap, so that a problem of shaking is avoided, to help improve connection stability, thereby enhancing connection.

In another embodiment, a shape of the cross section of the connection pin 5 may alternatively be a triangle, a rectangle, a polygon, a circle, or a combination thereof. A shape of the cross section of the third groove 63 matches the shape of the cross section of the connection pin 5, so that there is no gap when the connection pin 5 is engaged in the third groove 63, thereby improving connection stability.

Referring to FIG. 1, optionally, a spring groove 40 in communication with the mounting groove 4 is provided on the inner wall of the mounting groove 4 and inside the connection rod 1. The elastic member 3 includes a connection spring 31, and the connection spring 31 is mounted in the spring groove 40. One end of the connection spring 31 is connected to an inner wall of the spring groove 40, and another end of the connection spring 31 is configured to connect to the abutment rod 2.

Specifically, a diameter of the spring groove 40 is less than a diameter of the mounting groove 4 and less than a diameter of the abutment rod 2. When the abutment rod 2 is inserted into the mounting groove 4, the end portion of the abutment rod 2 is configured to compress the connection spring 31, and the inner wall connecting to the spring groove 40 of the mounting groove 4 limits the abutment rod 2, so that the abutment rod 2 can quickly move to the position connecting to the second groove 62 in the first groove 61, to improve mounting convenience.

In this embodiment, when the abutment rod 2 is inserted into the mounting groove 4, the end portion of the abutment rod 2 is configured to compress the connection spring 31, until displacement of the abutment rod 2 in an axial direction is limited when the abutment rod 2 is limited by the inner wall connecting to the spring groove 40 of the mounting groove 4. In this case, the connection pin 5 is at the position connecting to the second groove 62 in the first groove 61. Then, the abutment rod 2 is rotated, so that the connection pin 5 moves from the first groove 61 to the second groove 62. Then, the hand is loosened to remove the external force on the abutment rod 2. The connection spring 31 pushes the abutment rod 2 due to a restoration effect of the connection spring 31, and the connection pin 5 on the abutment rod 2 moves from the second groove 62 to the third groove 63. The connection spring 31 abuts against the abutment rod 2 to enable the connection pin 5 to be engaged in the third groove 63 more firmly, so that a problem of unstable connection due to a gap is avoided, and both connection stability and mounting convenience are improved.

Referring to FIG. 1, optionally, the elastic member 3 further includes a connection plate 32, and the connection plate 32 is configured to move in the mounting groove 4. One end of the spring groove 40 is connected to the inner wall of the spring groove 40, and another end of the connection spring 31 is connected to the connection plate 32. A groove 33 is provided in a middle part on a side of the connection plate 32 away from the connection spring 31, and the abutment rod 2 is configured to press against an interior of the groove 33.

In this embodiment, when the abutment rod 2 is inserted into the mounting groove 4, the end portion of the abutment rod 2 abuts in the groove 33. The connection plate 32 is pushed to compress the connection spring 31, until the connection plate 32 abuts against the inner wall of the mounting groove 4 connected to the spring groove 40, so that the abutment rod 2 is limited by the inner wall connecting to the spring groove 40 of the mounting groove 4 and stops displacement in the axial direction. In this case, the connection pin 5 is at the position connecting to the second groove 62 in the first groove 61. Then, the abutment rod 2 is rotated, so that the connection pin 5 moves from the first groove 61 to the second groove 62. The arrangement of the connection plate 32 helps enable the abutment rod 2 to be in the groove 33 when the abutment rod 2 compresses the connection spring 31, so that the abutment rod 2 is at a proper position during movement, and a problem of a position offset is avoided.

In another embodiment, the elastic member 3 may alternatively be of another structure or material having an elastic deformation capability, such as an elastic piece.

Referring to FIG. 1, optionally, the mounting groove 4 includes an inner groove 41, a middle groove 42, and a limiting groove 43 in communication with each other in sequence from inside to outside. The inner groove 41, the middle groove 42, and the limiting groove 43 are provided coaxially with the connection rod 1. A diameter of the inner groove 41 is greater than a diameter of the middle groove 42 and a diameter of the spring groove 40, and a diameter of the limiting groove 43 is greater than the diameter of the middle groove 42. The connection plate 32 is configured to move in the inner groove 41. The connection groove 6 is provided on an inner wall of the middle groove 42. A first step surface 44 is provided at a junction between the limiting groove 43 and the middle groove 42, and the opening 610 of the first groove 61 is provided facing the first step surface 44. The abutment rod 2 includes a first rod 21 and a second rod 22. The first rod 21 is configured to connect to an end of the cascade tube 8, and a diameter of the first rod 21 matches the limiting groove 43. The second rod 22 is configured to be arranged on an end of the first rod 21 away from the cascade tube 8, and a diameter of the second rod 22 matches the middle groove 42. A second step surface 23 is provided at a junction between the first rod 21 and the second rod 22, the second step surface 23 matches the first step surface 44, and the connection pin 5 is arranged on an outer wall of the second rod 22.

Specifically, the connection plate 32 moves in the inner groove 41. A diameter of the connection plate 32 is greater than the diameter of the spring groove 40, less than the diameter of the inner groove 41, and greater than the diameter of the middle groove 42.

In this embodiment, during mounting, the second rod 22 of the abutment rod 2 is inserted into the inner groove 41 and the middle groove 42, the connection pin 5 on the second rod 22 enters the first groove 61 through the opening 610 on the first step surface 44, and an end portion of the second rod 22 extends into the inner groove 41 to abut against and drive the connection plate 32. When the second rod 22 is at a proper position in the first groove 61 and the second groove 62, to be specific, axial movement of the abutment rod 2 facing the spring groove 40 is limited and the connection pin 5 is at the junction between the first groove 61 and the second groove 62, the first rod 21 is in the limiting groove 43, and the second step surface 23 is in contact with the first step surface 44. The first rod 21 and the second rod 22 respectively cooperate with the inner groove 41, the middle groove 42, and the limiting groove 43, so that a contact area between the abutment rod 2 and the mounting groove 4 is increased, to help improve connection tightness between the abutment rod 2 and the mounting groove 4.

Referring to FIG. 1, optionally, a plurality of pin grooves are evenly provided at intervals on the second rod 22 in a circumferential direction of the second rod 22, a shape of a cross section of the pin groove matches the shape of the cross section of the connection pin 5, and the connection pin 5 is detachably inserted into the pin groove.

In this embodiment, the connection pin 5 is detachably inserted into the pin groove, so that the connection pin 5 can be machined independently. Therefore, machining and production are convenient.

Referring to FIG. 1, optionally, a plurality of connection pins 5 are evenly arranged in a circumferential direction of the abutment rod 2, two rows of connection pins 5 are arranged in an axial direction of the abutment rod 2, and the two rows of connection pins 5 are alternately distributed at intervals. A plurality of connection grooves 6 are evenly provided at intervals on the inner wall of the middle groove 42, and a projection of the connection pin 5 in the axial direction of the abutment rod 2 matches a projection of the connection groove 6 in the axial direction of the connection rod 1.

Specifically, the two rows of connection pins 5 are arranged in the axial direction of the abutment rod 2, and positions of the two rows of connection pins 5 on the second rod 22 are at different distances to the second step surface 23. Correspondingly, for the two rows of connection pins 5 that are at different distances, a depth of the first groove 61 in the connection groove 6 corresponds to the connection pins 5, and a distance between the first step surface 44 and each of the second groove 62 and the third groove 63 also corresponds to the connection pins 5.

In this embodiment, the connection pins 5 are arranged in two rows in the axial direction of the abutment rod 2. Correspondingly, a quantity of connection grooves 6 is the same as a quantity of connection pins 5. This structure helps improve connection tightness between the abutment rod 2 and the connection rod 1.

Figure 5:
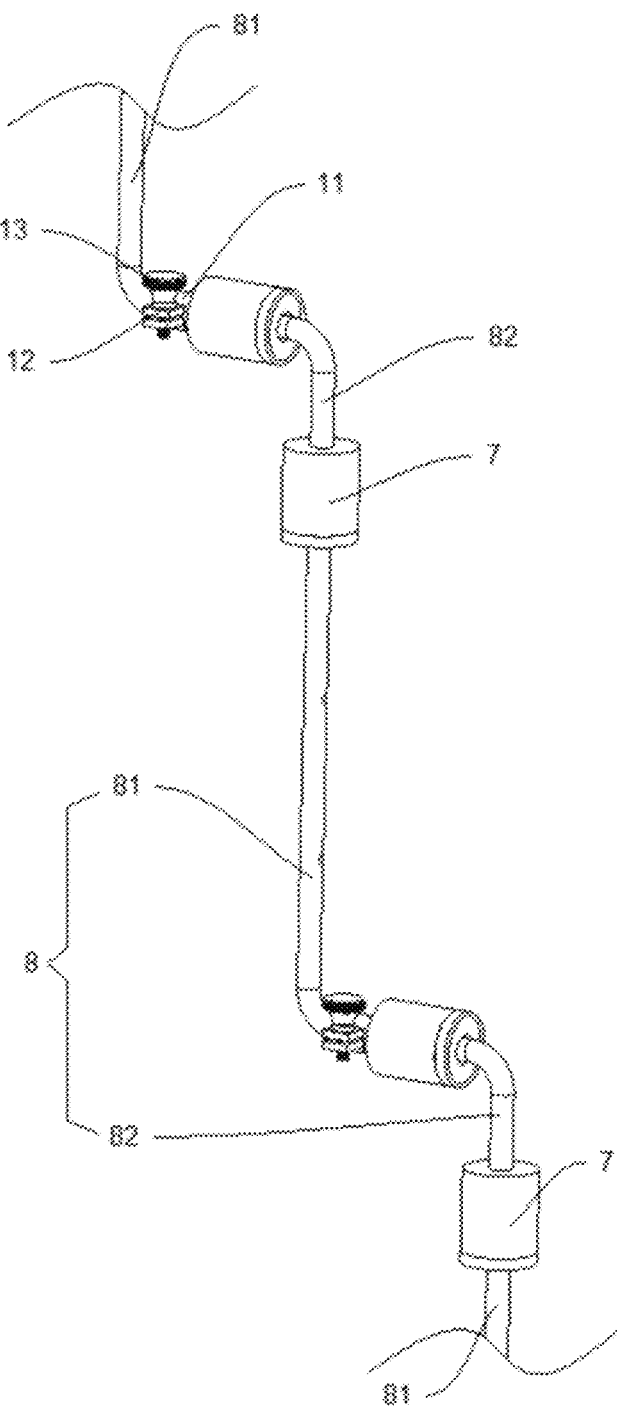
FIG. 5 is a schematic diagram of a structure of a cascade tube according to an embodiment of the present invention.

Referring to FIG. 5, optionally, the stackable quick-release apparatus further includes a fixing cylinder 11, a fixing plate 12, a fixing bolt 13, and a fixing nut. The fixing cylinder 11 is fixedly arranged at an end of the connection rod 1 away from the mounting groove 4, and an end of the cascade tube 8 is configured to be inserted into the fixing cylinder 11. A fixing groove is formed through a side wall of the fixing cylinder 11, fixing plates 12 are arranged on two sides of the fixing groove on the side wall of the fixing cylinder 11, and the two fixing plates 12 are configured to be connected by the fixing bolt 13 and the fixing nut.

In this embodiment, when the connection rod 1 is mounted at one end of the cascade tube 8, the end of the cascade tube 8 is inserted into the fixing cylinder 11. Then, the two fixing plates 12 are fixed through mutual cooperation between the fixing bolt 13 and the fixing nut. Because the fixing plates 12 are arranged on the two sides of the fixing groove, when the fixing bolt 13 and the fixing nut fix the fixing plates 12, the fixing cylinder 11 clamps and fixes the end of the cascade tube 8 outside the end of the cascade tube 8, so that the connection rod 1 is connected to the end of the cascade tube 8.

Referring to FIG. 5, the present invention further provides a surgical navigation system. The system may be for measuring distances and orientations of a key cutting position and an anatomical structure in a surgery. The surgical navigation system includes a cascade tube 8 and the foregoing stackable quick-release apparatus. The cascade tube 8 includes a first bent tube 81 and a second bent tube 82. The first bent tube 81 and the second bent tube 82 are of an L-shaped structure. A connection rod 1 of the stackable quick-release apparatus is configured to connect to an end of the first bent tube 81, and an abutment rod 2 of the stackable quick-release apparatus is configured to connect to an end of the second bent tube 82.

In this embodiment, when the two adjacent cascade tubes 8 are connected, the abutment rod 2 on the second bent tube 82 on one of the cascade tubes 8 is configured to be inserted into a mounting groove 4 of the connection rod 1 on the first bent tube 81 on the other of the cascade tubes 8 and abut against an elastic member 3.

The first bent tube 81 of the cascade tube 8 is inserted into a fixing cylinder 11, and then two fixing plates 12 are fixed through mutual cooperation between a fixing bolt 13 and a fixing nut, so that the connection rod 1 is connected to the first bent tube 81 of the cascade tube 8.

Referring to FIG. 5, optionally, the surgical navigation system further includes a rotation structure 7. An end of the first bent tube 81 away from the connection rod 1 and an end of the second bent tube 82 away from the abutment rod 2 are connected by the rotation structure 7, to enable the first bent tube 81 and the second bent tube 82 to rotate relative to each other.

In this embodiment, the rotation structure 7 is mounted on the cascade tube 8, so that the first bent tube 81 and the second bent tube 82 of the cascade tube 8 can rotate relative to each other. This structure helps adjust a rotation direction of the cascade tube 8, and further helps adjust a mounting direction of the two adjacent cascade tubes 8.

Figure 3:
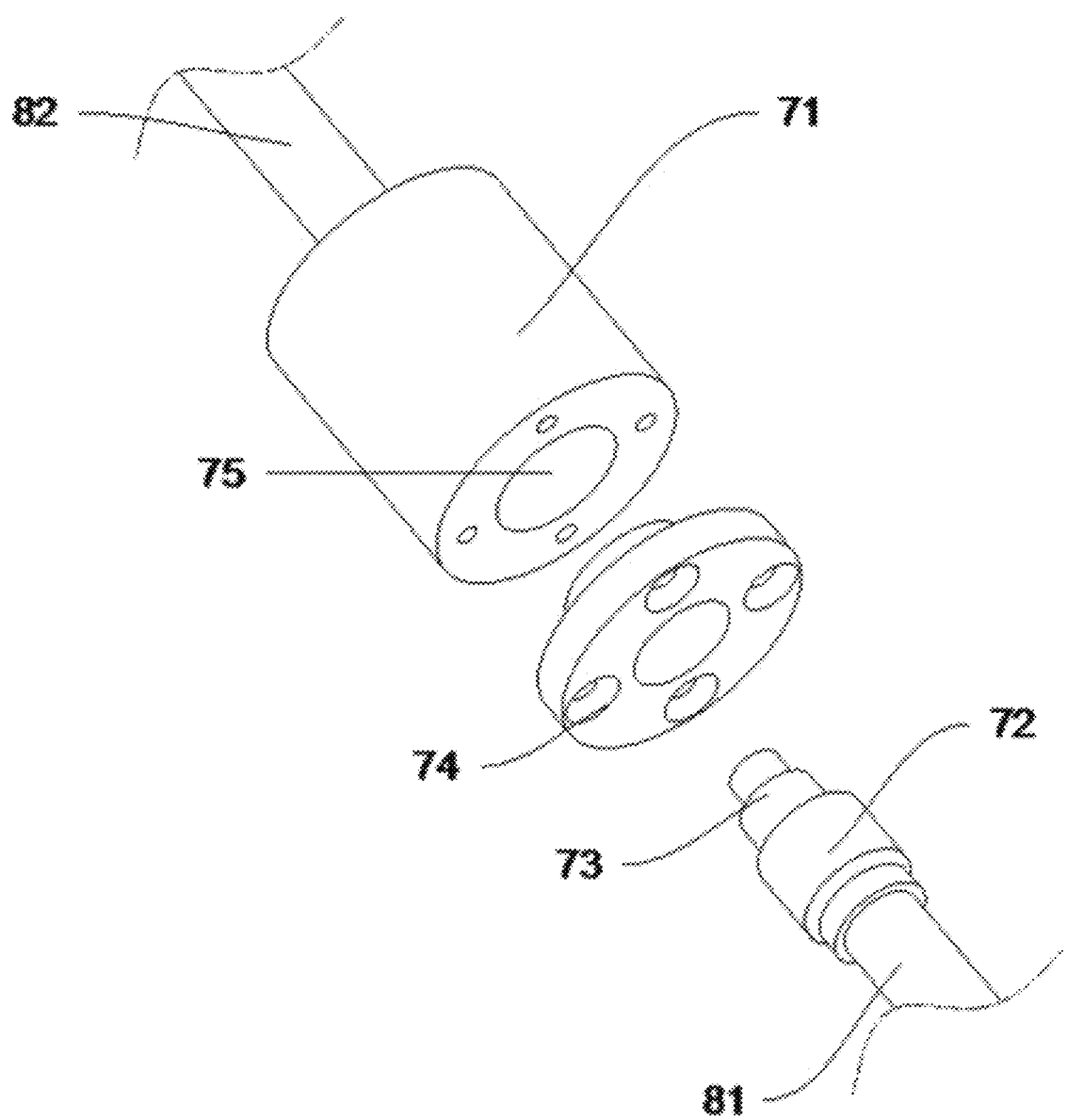
FIG. 3 is a schematic structural exploded view of a rotation structure according to an embodiment of the present invention.
Figure 4:
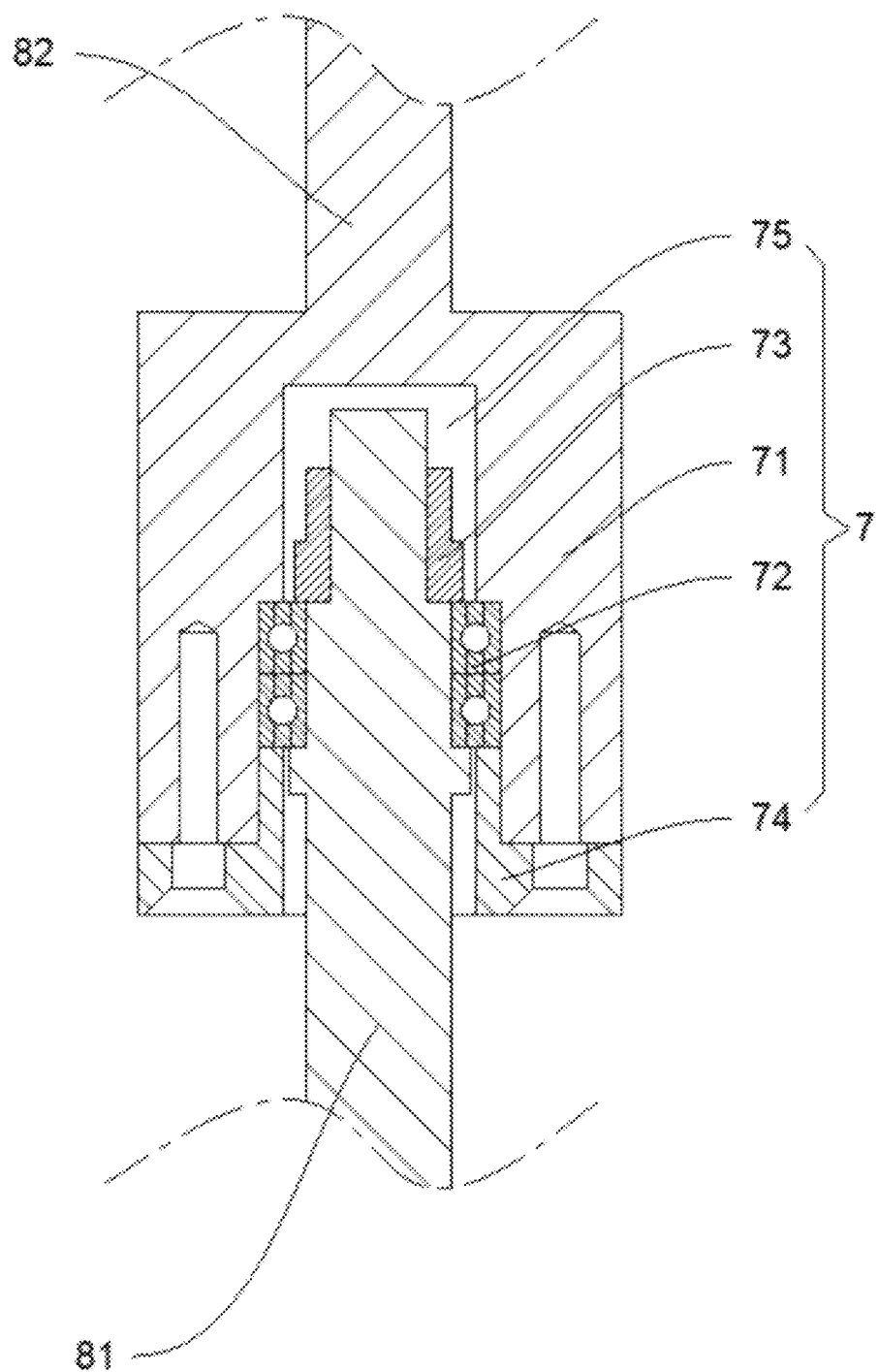
FIG. 4 is a schematic structural cross-sectional view of a rotation structure according to an embodiment of the present invention.

Referring to FIG. 3 and FIG. 4, optionally, the rotation structure 7 includes a connection head 71, a rotation bearing 72, a limiting portion 73, and a connection cap 74. The rotation bearing 72 is sleeved on the end of the first bent tube 81 away from the connection rod 1, and the limiting portion 73 is mounted in an end portion of the first bent tube 81 outside the rotation bearing 72.

The connection head 71 is fixedly connected to the end of the second bent tube 82 away from the abutment rod 2. A connection through groove 75 matching the first bent tube 81, the rotation bearing 72, and the limiting portion 73 is provided at an end portion of the connection head 71. The end of the first bent tube 81 away from the connection rod 1, the rotation bearing 72, and the limiting portion 73 are configured to be mounted in the connection through groove 75. The connection cap 74 is configured to be fixed to the connection head 71 facing the connection through groove 75 by a screw and to limit the rotation bearing 72 and the limiting portion 73 in the connection through groove 75.

Specifically, the positions of the first bent tube 81 and the second bent tube 82 may be interchanged, i.e., the first bent tube 81 is configured to fixedly connect to the connection head 71, and the limiting portion 73 and the rotation bearing 72 may be arranged on the second bent tube 82.

In the present embodiment, the arrangement of the limiting portion 73 is for limiting a position of the rotation bearing 72, to prevent the rotation bearing 72 from falling off from the first bent tube 81. The rotation bearing 72 and the connection through groove 75 cooperate with each other to rotatably connect the first bent tube 81 and the second bent tube 82, so that the first bent tube 81 and the second bent tube 82 of the cascade tube 8 can rotate relative to each other. Therefore, flexibility of the cascade tube 8 during use is improved, so that the cascade tube 8 can rotate based on an actual requirement, and accuracy of a navigation position is ensured.

Optionally, the surgical navigation system further includes a sensor and an operating apparatus. The operating apparatus is arranged at a tail end of a last cascade tube 8 in the surgical navigation system, and the operating apparatus is configured to extend into an oral cavity and perform a surgery on the oral cavity. The sensor is mounted on the cascade tube 8.

In this embodiment, the sensor is configured to obtain a position of the cascade tube 8, calculate and determine a position of the operating apparatus, where the accurate position of the operating apparatus is expressed using coordinates, so that distance measurement, level measurement, and orientation determination in a surgery can be realized. This helps improve precision of the surgical navigation system during use and improve surgery safety.

Although the present invention is disclosed above, the protection scope of the present invention is not limited thereto. A person skilled in the art may make various changes and modifications without departing from the spirit and scope of the present invention, and these changes and modifications all fall within the protection scope of the present invention.

What is claimed is:

1. A surgical navigation system, comprising:
a rotation structure;
a plurality of cascade tubes; and
a plurality of stackable quick-release apparatuses,
wherein each stackable quick-release apparatus is configured to connect two adjacent cascade tubes, and comprises;
a connection rod, an abutment rod, and an elastic member,
wherein the connection rod and the abutment rod are respectively arranged at two ends of the adjacent cascade tubes; and
wherein a mounting groove is provided in an end surface of the connection rod, the elastic member is configured to be mounted in an inner wall of the mounting groove, and the abutment rod on a first one of the cascade tubes is configured to be inserted into the mounting groove of the connection rod on a second one of the cascade tubes and abut against the elastic member;
wherein the plurality of cascade tubes comprises a first bent tube and a second bent tube, the first bent tube and the second bent tube are of an L-shaped structure, the connection rod of one of the plurality of quick-release apparatuses is connected to an end of the first bent tube, the abutment rod of another one of the plurality of quick-release apparatuses is connected to an end of the second bent tube, and an end of the first bent tube away from the connection rod and an end of the second bent tube away from the abutment rod are connected by the rotation structure, to enable the first bent tube and the second bent tube to rotate relative to each other;
wherein the rotation structure comprises a connection head, a rotation bearing, a limiting portion, and a connection cap, the rotation bearing is sleeved on the end of the first bent tube away from the connection rod, and the limiting portion is mounted in an end portion of the first bent tube outside the rotation bearing; and
wherein the connection head is fixedly connected to the end of the second bent tube away from the abutment rod, a connection through groove matching the first bent tube, the rotation bearing, and the limiting portion is provided at an end portion of the connection head, and the end of the first bent tube away from the connection rod, the rotation bearing, and the limiting portion are configured to be mounted in the connection through groove; and
wherein the connection cap is configured to be fixed to the connection head facing the connection through groove by a screw and to limit the rotation bearing and the limiting portion in the connection through groove;
wherein a connection pin is arranged on an outer wall of each abutment rod;
wherein a connection groove matching the connection pin is provided in the inner wall of the mounting groove of each connecting rod, the connection groove comprises a first groove, a second groove, and a third groove, the first groove is provided in an axial direction of the connection rod, and an opening of the first groove is provided facing an access opening of the mounting groove; the second groove perpendicular to the first groove is connected to an end of the first groove away from the opening, the third groove is connected to an end of the second groove away from the first groove, and the third groove and the first groove are provided in the same direction;

wherein a cross section of the connection pin is of an isosceles trapezoid, a width of the first groove is greater than a longer base of the isosceles trapezoid, a width of the second groove is greater than a height of the isosceles trapezoid, and a shape of the third groove matches the cross section of the connection pin;

wherein a spring groove in communication with the mounting groove is provided in the inner wall of the mounting groove and inside each connection rod; and wherein the elastic member comprises a connection spring, the connection spring is mounted in the spring groove, a first end of the connection spring is connected to an inner wall of the spring groove, and a second end of the connection spring is configured to connect to the abutment rod;

wherein the elastic member further comprises a connection plate, the connection plate is configured to move in the mounting groove, the first end of the connection spring is connected to the inner wall of the spring groove, and the second end of the connection spring is connected to the connection plate; and wherein a groove is provided in a middle part on a side of the connection plate away from the connection spring, and the abutment rod is configured to press against an interior of the groove;

wherein the mounting groove of each connecting rod comprises an inner groove, a middle groove, and a limiting groove in communication with each other in sequence from inside to outside, and the inner groove, the middle groove, and the limiting groove are provided coaxially with the connection rod;

wherein a diameter of the inner groove is greater than a diameter of the middle groove, and a diameter of the limiting groove is greater than the diameter of the middle groove;

wherein the connection plate is configured to move in the inner groove, a diameter of the connection plate is greater than a diameter of the spring groove, less than the diameter of the inner groove, and greater than the diameter of the middle groove; and wherein the connection groove is provided in an inner wall of the middle groove, a first step surface is provided at a junction between the limiting groove and the middle groove, and the opening of the first groove is provided facing the first step surface; and wherein each abutment rod comprises a first rod and a second rod, the first rod is configured to connect to an end of the cascade tube, a diameter of the first rod matches the limiting groove, the second rod is configured to be arranged on an end of the first rod away from the cascade tube, a diameter of the second rod matches the middle groove, a second step surface is provided at a junction between the first rod and the second rod, the second step surface matches the first step surface, and the connection pin is arranged on an outer wall of the second rod;

wherein the abutment rod is configured to be inserted into the mounting groove and rotated, to enable the connection pin to move into the first groove and move from the first groove to the second groove; and the elastic member is configured to abut against the abutment rod, to enable the connection pin on the outer wall of the abutment rod to be engaged in the third groove; and wherein a guide chamfer is provided in the second groove, and the guide chamfer is gradually inclined toward the end away from the opening in a direction from the first groove to the third groove.

2. The surgical navigation system according to claim 1, wherein a plurality of connection pins are evenly arranged in a circumferential direction of the abutment rod, two rows of connection pins are arranged in an axial direction of the abutment rod, and the two rows of connection pins are alternately distributed at intervals; and wherein a plurality of connection grooves are evenly provided at intervals in the inner wall of the middle groove, and a projection of the connection pin in the axial direction of the abutment rod matches a projection of the connection groove in the axial direction of the connection rod.

3. The surgical navigation system according to claim 1, wherein the stackable quick-release apparatus further comprises a fixing cylinder, a fixing plate, a fixing bolt, and a fixing nut, wherein the fixing cylinder is fixedly arranged at an end of the connection rod away from the mounting groove, and an end of the cascade tube is configured to be inserted into the fixing cylinder; and wherein a fixing groove is formed through a side wall of the fixing cylinder, two fixing plates are arranged on two sides of the fixing groove on the side wall of the fixing cylinder, and the two fixing plates are configured to be connected by the fixing bolt and the fixing nut.

* * * * *